July 28, 1959 L. H. FINNEBURGH, JR 2,897,497

SELECTIVE MULTIPLE CHANNEL TV ANTENNAS

Filed March 13, 1959 2 Sheets-Sheet 1

INVENTOR.
LEWIS H. FINNEBURGH, JR.
BY Ely, Pearne & Gordon
ATTORNEYS

July 28, 1959 L. H. FINNEBURGH JR 2,897,497

SELECTIVE MULTIPLE CHANNEL TV ANTENNAS

Filed March 13, 1959 2 Sheets-Sheet 2

INVENTOR.
LEWIS H. FINNEBURGH, JR.
BY Ely, Pearne & Gordon
ATTORNEYS

United States Patent Office 2,897,497
Patented July 28, 1959

2,897,497

SELECTIVE MULTIPLE CHANNEL TV ANTENNAS

Lewis H. Finneburgh, Jr., Shaker Heights, Ohio

Application March 13, 1959, Serial No. 799,170
9 Claims. (Cl. 343—819)

This invention relates to radio frequency antennas and particularly to antennas for television reception.

One of the principal problems that faced the television antenna industry in the earlier days of television development was to provide an antenna having high gain with a reasonably uniform impedance over the entire low and high band frequency ranges established for commercial television broadcasting. Another problem was to provide such an antenna with high direction sensitivity, low sensitivity at frequencies outside of the two established television bands, and a high "front-to-back ratio," so as to keep interference to a minimum.

As the effective reception range of antennas and television sets was improved over the years, and the number of broadcasting stations increased, broad band reception was not any longer desirable in many geographical locations. It frequently became important to design an antenna which, for example, would have high gain in one direciton on, say, channels 8 and 13 in the high band, for receiving both channels from a relatively nearby location while suppressing signals from other channels in the high band adjacent to channels 8 and/or 13 emanating from relatively more remote locations in the same general direction. It also became desirable in other instances to receive broadcasts on one or more channels in one direction and on one or more different channels in the opposite direction, with high gain and a good front-to-back ratio in each instance and without requiring rotation of the antenna to point in the direction of the broadcasting station from which reception is desired.

Because of the above and similar complications of the problems of television reception, particularly in "fringe area" locations relatively remote from any broadcasting center, the practice has developed in the television antenna industry of tailoring the design of antennas for the peculiar reception problems existing in the areas in which the antennas are to be sold. This has led the industry to seek new and better means for solving the reception problems peculiar to specific geographical areas. As a matter of production economy and efficiency in following this practice, it has become important to devise ways of using essentially the same types of driven and nondriven or parasitic antenna elements adapted for use in different combinations and arrangements to solve any of the various reception problems encountered, making only dimensional changes, as distinguished from configuration changes, in the several antenna elements so that they are readily manufactured in more or less standardized production lines with minimum tooling changes and adjustments being required when switching from the production of one type of antenna to another.

The principal objects of the present invention are to provide television antennas better adapted to meet the exacting requirements of the above-described recently developed practice of tailoring antennas for specific geographical areas. More particularly, it is an object of the invention to provide television antennas having the greatest possible gain and direction sensitivity on selected channels (particularly high band channels), and, in some instances, with the greatest possible discrimination against interfering signals coming in the same general direction from more remote stations on closely adjacent channels.

A further object of the invention is to accomplish the foregoing with an assembly of standard types of antenna elements that are equally well adapted for use in other combinations and arrangements to achieve different reception characteristics.

In carrying out the present invention use is made of certain principles and antenna elements of the types that are also suitable for use as described and claimed in U.S. Patent No. 2,872,681, granted February 3, 1959, to George P. Kearse, and U.S. Patent No. Re. 24,413, granted January 7, 1958, to Robert S. Weiss.

In accordance with the aforementioned Kearse patent, a driven, low band, half-wave dipole is also adapted for reception of signals in the high band range by disposing a pair of nondriven, high band, half-wave dipoles of equal length in closely spaced parallel relationship with the driven dipole, one of the nondriven dipoles being disposed centrally in front of and the other being disposed centrally behind the driven dipole with reference to a single direction of maximum sensitivity. By combining such an array with conventional reflectors, an antenna was provided which would function with high gain and high direction sensitivity on low band over the normal frequency range of the low band driven dipole alone, and also in the high band over the normal range of a three-element collinear array of high band, half-wave dipoles.

In accordance with the aforementioned Weiss patent, essentially the same reception characteristics are obtained as were obtained by Kearse, but with fewer antenna elements and an improved front-to-back ratio, by using only one of the nondriven, high band dipoles utilized by Kearse and disposing it in closely spaced parallel relationship centrally in front of the driven, low band dipole, omitting the nondriven, high band dipole which Kearse utilized immediately behind the driven, low band dipole.

The above-described inventions of Kearse and of Weiss provide quite good broad band characteristics over the high band channels, but, as would be expected, the gain falls off noticeably on channels much above or below the frequency at which maximum high band gain is obtained. For example, when the nondriven dipole or dipoles are cut to peak on channel 11, the gain would generally be noticeably less on channels 9 and 13, although nearly as good on channels 10 and 12 as on channel 11.

Subsequent to the development of the inventions of the aforementioned Kearse and Weiss patents, use was made of the principles of the Weiss patent to achieve optimum reception from one direction on one high band channel and optimum reception from the opposite direction on a different high band channel. This was accomplished by dimensioning the single, nondriven, high band dipole of the Weiss patent for one of the desired high band channels and disposing it on one side of the driven, low band dipole, and by additionally employing a second, nondriven, high band dipole dimensioned for the other desired high band channel and disposed on the opposite side of the driven, low band dipole. As a result, one of the nondriven, high band dipoles rendered the array responsive with high gain and high direction sensitivity in one direction for the channel for which it was dimensioned, and the other nondriven, high band dipole rendered the array responsive with high gain and high direction sensitivity in the opposite direction for the other high band channel for which it was dimensioned. This amounted, in effect, to using the Weiss invention twice with the same driven, low band dipole by achieving the mode of operation and results of the Weiss invention on one high band channel in one direction with an appropriately dimensioned nondriven, high band dipole disposed on one side of the driven, low band dipole, and in the opposite direction on a different channel with another differently dimensioned, nondriven, high band dipole disposed on the opposite side of the driven, low band dipole.

In accordance with the present invention, the bidirectional sensitivity of the type of array last described is converted to unidirectional sensitivity for the same combination of high band channels, provided that the two channels are separated in the high band range by at least one intervening channel and, preferably, two or more intervening channels on which reception is not desired or, at least, is not required. This result is achieved by using two nondriven, high band dipoles of substantially different lengths, one disposed centrally in front of and the other disposed centrally behind the driven, low band dipole with reference to a single direction of maximum sensitivity and in closely-spaced parallel relationship with the low band dipole, as was done in the array last described. The former bidirectional sensitivity, however, is changed to unidirectional sensitivity for the two desired high band channels (for which the two nondriven dipoles are respectively dimensioned) by disposing a high band reflector behind the array with reference to the desired single direction of maximum sensitivity, the reflector being dimensioned relative to the two nondriven, high band dipoles and spaced from the driven, low band dipole for reflector action on substantially the lower of the two high band channels for which the nondriven dipoles are respectively dimensioned. As will be hereinafter more fully explained, the effect of the nondriven, high band dipole disposed between the high band reflector and the driven, low band dipole is substantially nullified in its normal direction of maximum sensitivity (i.e., in the direction of the reflector) and is converted to a substantially equal degree of sensitivity in the opposite direction (i.e., in the same direction of maximum sensitivity as the other nondriven, high band dipole). The surprising result of this combination of elements is that each of the nondriven, high band dipoles, disposed on opposite sides of the driven, low band dipole, retains substantially its normal effectiveness on the channel for which it is dimensioned, without hindrance from the other nondriven, high band dipole. This result has not been obtainable with any degree of satisfaction where both of the differently dimensioned nondriven dipoles are disposed one in front of another on the same side of (i.e., forwardly of) the driven dipole.

The combination of elements of the present invention however, frequently does produce an interfering or nullifying action of the nondriven dipoles on each other at certain frequencies between their respective optimum frequencies, acting like a trap to destroy or detract from the sensitivity of the antenna over at least some part of the frequency range between the optimum frequencies for which the nondriven, high band dipoles are designed. This trap effect is ordinarily not objectionable and is sometimes desirable in the situations for which the invention is useful because it reduces interference from broadcasts on the intervening channels for which reception is not required.

Where the present invention is used with the nondriven dipoles dimensioned for adjacent high band channels, the above-mentioned trap effect may detract from the performance over a part of the range of one or both channels. Moreover, the inventions of both the Kearse patent and the Weiss patent, mentioned above, produce sufficiently broad band response to cover two adjacent channels with substantially optimum gain. Hence, the practical value of the present invention appears to be limited to situations in which the nondriven dipoles are of substantially different electrical lengths for producing optimum reception on two high band channels that are separated by at least one intervening channel.

In addition to the basic elements utilized as explained above in carrying out the present invention, various additional reflectors and various directors may be employed as desired.

The present invention will be more fully understood by a description of two illustrative embodiments thereof shown in the accompanying drawings by way of example. Referring to the drawings—

Figure 1:
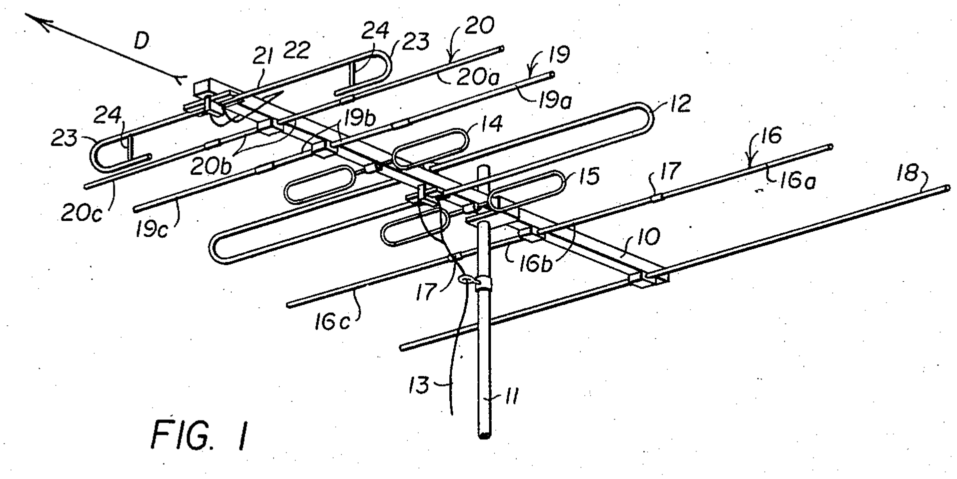
Figure 1 is a perspective view of an antenna embodying the invention.
Figure 2:
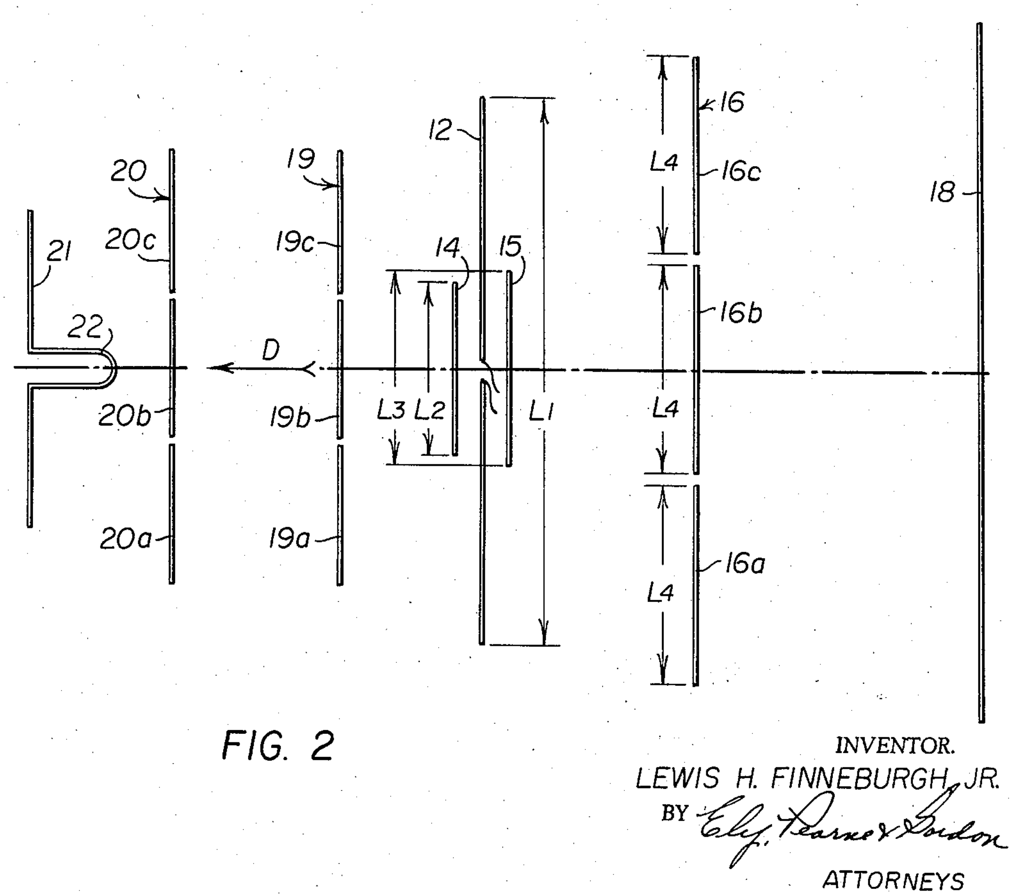
Fig. 2 is a diagrammatic plan view of the electrically functioning elements of the antenna of Fig. 1.

Referring first to the antenna of Figs. 1 and 2, the several electrically functioning elements are shown in Fig. 1 mounted on a horizontally disposed boom 10 secured in any desired manner to a vertical mast 11. The principal electrically functioning elements in this particular antenna are arranged to have maximum sensitivity in the single direction indicated by the arrow D at what is considered the front of the antenna. These electrically functioning elements comprise a conventional low band, folded dipole 12 having the ends of a two-conductor transmission line 13 connected thereto in a conventional manner; an anterior, closely spaced, nondriven, high band dipole 14, which is a little less than one-third the electrical length of the folded dipole 12 in this embodiment of the invention; a posterior, closely spaced, nondriven, high band dipole 15, which is a little greater than one-third the electrical length of the folded dipole 12 in this embodiment of the invention; and a high band reflector, generally designated 16, disposed further to the rear of the driven folded dipole 12, behind the nondriven dipole 15. These elements constitute the basic array for achieving the objects of the invention.

As shown, the nondriven dipoles 14 and 15 are in the form of a short, central rod terminating at each end in elongated loops. This shape has some effect upon the electrical characteristics of the antenna compared to a plain rod of the same diameter and length, but the particular shape is purely arbitrary, since the same effects may be obtained with different conductor configurations, as will be appreciated by those skilled in the art. Basically, the nondriven dipoles 14 and 15 could be plain, straight rods or tubes of appropriate diameter and length and still function in the same manner.

The high band reflector 16 comprises three collinear, tubular conductors **16*a*, 16*b*, and 16*c* connected one to another in axially spaced relationship by a pair of insulators 17 that may suitably extend snugly into the adjacent members connected thereby for holding them rigidly in coaxial alignment. Each individual conductor 16*a*, 16*b*, and 16*c* may suitably be slightly longer than the nondriven dipole 15, in this instance, so as to be efficient as a reflector over the frequency range of the high band channel for which the nondriven conductor 15 is used. The collinear reflector 16 is spaced from the driven dipole 12 a distance selected with the same objective in view. In arrays of the type here involved, this spacing may depart somewhat from conventional spacings for high band reflectors in order to also obtain good reflector action on the higher channel for which the shorter nondriven dipole is dimensioned. Further details of the dimensions and relative spacings of electrical elements 12, 14, 15, and 16** will be given below with reference to Fig. 2.

The other electrically functioning elements of the antenna of Figs. 1 and 2 comprise a conventional low band reflector 18 dimensioned relative to and spaced rearwardly from the driven dipole 12 for normal low band reflector action at the low band frequency for which optimum response of the driven dipole 12 is desired. This frequency of optimum response of the driven dipole 12, and the gain and normal two-lobe radiation pattern of this dipole, at or near that optimum frequency, are substantially unaffected by the presence of the nondriven, high band dipoles 14 and 15; and the low band reflector 18 performs its function in the low band range in a normal manner in accordance with normal reflector theory, so as to maximize the single forward lobe of the radiation pattern and minimize the single rearward lobe.

A three-element, high band, collinear director, generally designated 19, is desirably positioned forwardly of the driven, low band dipole 12 and of the nondriven, high band dipole 14. Its spacing from the low band dipole 12 and the length of its collinear elements *19a*, *19b*, and *19c* are determined by normal director theory, considering the low band dipole 12 as though it were a high band, three-element, collinear array.

In order to further enhance the gain of the antenna on high band, a second, similar, high band, collinear director, generally designated 20, is desirably positioned forwardly of the director 19. Its spacing from the director 19 and the length of its collinear elements *20a*, *20b*, and *20c* are also determined by normal director theory as in conventional Yagi arrays, again considering the low band dipole 12 as though it were a high band collinear array.

Finally, another director, generally designated 21, is desirably positioned forwardly of the driven dipole 12 and is located and specially designed to function both as a low band director and as a high band director, although primarily as a low band director. The considerations involved in the design of this director 21 were to avoid interfering with high band performance at the frequencies for which the nondriven dipoles 14 and 15 are dimensioned, while enhancing the gain at the optimum frequency in the low band for which the length of the driven dipole 12 is selected. By employing a shorted or closed stub 22 in the center of the director 21 and reversely turned end portions 23 at its outer ends, supported by transverse braces 24 of insulator material, the overall physical length of this director can be kept to a minimum to avoid detracting from the performance of the antenna in the high band range, and, in some instances, to enhance that performance. At the same time, these features of the director 21 give it an effective electrical length at low band frequencies that is suitable for effective operation as a low band director. The frequency of optimum effectiveness of the director 21 on low band may be varied by adjusting the length of the stub 22 or the lengths of the reversely turned portions 23, or the tip-to-tip length of the director, and selecting the form which will give the greatest gain on a desired low band channel or channels without detracting from the gain on the desired high band channels.

Referring now to Fig. 2, illustrative dimensions will be given for rendering this antenna effective with high gain on channels 3, 8, and 13 in the forward direction D. It will be understood that these illustrative dimensions may be varied to adapt the antenna for receiving other combinations of low and high band channels in accordance with the invention.

The driven, folded dipole 12 may suitably be made of ⅜ inch diameter aluminum tubing and may have an overall length $L_1$ of 84 inches. This length is substantially shorter than desired for optimum gain on channel 3 but is preferably employed, in combination with the nondriven dipoles 14 and 15, to obtain the greatest possible gain on both channels 8 and 13 in the high band. This permits the electrical lengths of the nondriven dipoles 14 and 15 to be made closer to one-third of the electrical length of the driven dipole 12 while being appropriately dimensioned, respectively, to effect high gain on channels 8 and 13 in the particular assembly shown.

The nondriven dipole 14 may suitably be made of aluminum rod 0.13 inch in diameter and may have a tip-to-tip length $L_2$ of 27 inches, as folded. This length of the nondriven dipole 14, when it is spaced about 2 inches in front of the driven, folded dipole 12, renders this combination of elements effective with high gain on channel 13, with essentially a two-lobe radiation pattern characteristic of the pattern of a three-element collinear array dimensioned for channel 13. As disclosed in the aforementioned Weiss patent, however, this two-lobe radiation pattern, when obtained in this manner, has a substantial front-to-back ratio.

The nondriven dipole 15 may suitably be made of the same material and configuration as the nondriven dipole 14 and may have a tip-to-tip length $L_3$ of 29 inches, as folded. By spacing this dipole about 3½ inches behind the driven dipole 12, this combination of elements is rendered effective with high gain on channel 8 in the high band, with essentially a two-lobe radiation pattern characteristic of the pattern of a three-element collinear array dimensioned for optimum gain on channel 8. When obtained in this manner, however, this two-lobe radiation pattern would normally have a substantial back-to-front ratio (instead of a front-to-back ratio).

It will be noted that the interior nondriven dipole 14, in this instance, is the shorter of the two nondriven dipoles 14 and 15, i.e. is resonant as a half-wave dipole at a higher frequency than the posterior nondriven dipole 15. This is generally the preferred arrangement, although it is not a necessary arrangement, as demonstrated by the second embodiment of the invention shown in Figs. 3 and 4, which may give superior results in special situations as hereinafter described.

The collinear high band reflector 16 may suitably have its three conductors *16a*, *16b*, and *16c* made of lengths of ⅜ inch diameter tubing, each having a length $L_4$ of 31 inches. It is suitably spaced about 15 inches behind the driven, folded dipole 12. This length and spacing are the result of "cut and try" experimentation to obtain maximum forward gain on both channels 8 and 13 while reversing the direction of maximum gain on channel 8. An important consideration in this regard is that the elements of the reflector 16 be at least slightly longer, electrically, than a half-wave at the minimum frequency of channel 8. This is necessary to insure that this reflector 16 will definitely be a reflector over the entire frequency range of channel 8. Although longer than ideal for serving as a channel 13 reflector, it still functions effectively as a channel 13 reflector, since excessive length of a reflector is not as detrimental to its function as insufficient length.

When so dimensioned and arranged, this reflector 16 substantially improves the forward gain on channel 13, for which the length and position of the shorter, anterior, nondriven dipole 15 were selected. In addition to acting in this manner, the reflector 16 is also effective to substantially reverse the radiation pattern and increase the gain on channel 8, for which the length of the nondriven dipole 15 is selected, thus rendering the array highly effective in the forward direction D on channel 8, as well as on channel 13, while minimizing the signals received by the array on both channels 8 and 13 from the rear of the antenna.

With the nondriven dipole 14 dimensioned for channel 13 and disposed in front of the folded dipole 12, the additional presence of the nondriven dipole 15, dimensioned for channel 8 and disposed behind the folded dipole 12, would be expected to have no beneficial effect on the gain of the antenna on channel 8 in the forward direction D and actually to have an adverse effect on channel 8 in that direction. However, with the additional presence of the high band reflector 16, the gain obtained on channel 8 in the forward direction may be as great as the gain obtained on channel 13 in the forward direction. This result is not explainable by the broad band characteristics of the invention of either the Kearse or the Weiss patent, since the gain with the present antenna drops significantly between channels 8 and 13 at which the gain on high band reaches pronounced peaks. As mentioned above, the nondriven elements 14 and 15, dimensioned respectively for channels 13 and 8, tend to nullify each other to a substantial degree at certain frequencies between the frequencies of those channels, acting like a trap to destroy or detract from the sensitivity of the array over at least some part of the intermediate frequency range. It is for this reason that the channels for which the nondriven dipoles 14 and 15 are designed should be separated by at least one intervening channel on which reception is not required.

It will be noted that the lengths of both of the nondriven dipoles 14 and 15 depart considerably from one-third the electrical length of the driven dipole 12. Some departure from the approximate 1:3 relationship may also be desirable in carrying out the objectives of Weiss, as pointed out in his patent. Some compromise is necessarily required in carrying out the present invention because the non-driven dipoles 14 and 15, which are of different lengths, are used in combination with the same driven, low band dipole 12 to produce the greatest possible gain on each of two different high band channels separated by at least one intervening channel.

The optimum spacing of the nondriven dipoles 14 and 15 from the driven dipole 12, as well as their optimum lengths, may be adjusted to give the array as a whole the nearest possible approach to a 300 ohm impedance when receiving signals on the high band channels for which the antenna is specifically designed, while also achieving the greatest possible gain on these channels. In this connection it should be noted that the presence of the nondriven dipoles 14 and 15 has relatively little effect on the impedance of the array when receiving signals in the low band and virtually no effect on the low band gain of the antenna.

Referring now to the low band reflector 18 and the three directors 19, 20, and 21, these elements constitute no necessary part of the basic combination of elements of the invention and are subject to considerable variation to enhance the results of the invention as local requirements and cost considerations may dictate. They may be omitted entirely, or some may be omitted and others retained, or an even greater number of reflectors and/or directors may be employed, if desired, according to known principles and common practices in the industry. For this reason, a more detailed description of specific dimensional details of elements 18, 19, 20, and 21 and of their arrangement is believed to be unnecessary. These particular elements 18, 19, 20, and 21 have been shown and described in a more general way merely to illustrate one desirable arrangement of directors and a low band reflector found to be particularly effective when used with the basic combination of elements 12, 14, 15, and 16.

Summarizing the overall effect of all of the electrically functioning elements in the antenna of Figs. 1 and 2, by selecting the proper dimensions for the parasitic elements 18, 19, 20, and 21 in accordance with known principles of reflector and director design, the antenna will have pronounced forward gain peaks on channels 3, 8, and 13. On low band, the gain will fall off markedly in either direction from channel 3. On high band, the gain will drop off some on channels 7 and 9 and on channel 12, and to a considerably greater degree on channels 10 and 11.

By reason of the presence of the high band reflector 16 and the low band reflector 18, moreover, as well as by reason of the directors 19, 20, and 21, the array has a very high front-to-back ratio on the several low and high band channels for which it is specifically designed. As pointed out above, the high band reflector 16 is essential in the combination to achieve the desired forward gain on the high band channels for which the antenna is specifically designed, with a good front-to-back ratio, although the reflector 16 need not necessarily be of the particular collinear type shown and described. On the other hand, the low band reflector 18 and the directors 19, 20, and 21, or any of numerous possible variations thereof, are optional for enhancing the desired characteristics of the basic combination of elements 12, 14, 15, and 16.

Figure 3:
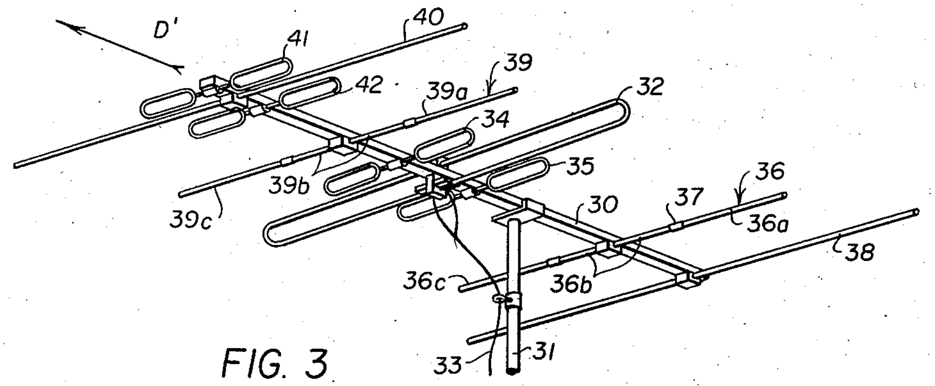
Fig. 3 is a perspective view of an antenna embodying another form of the invention.
Figure 4:
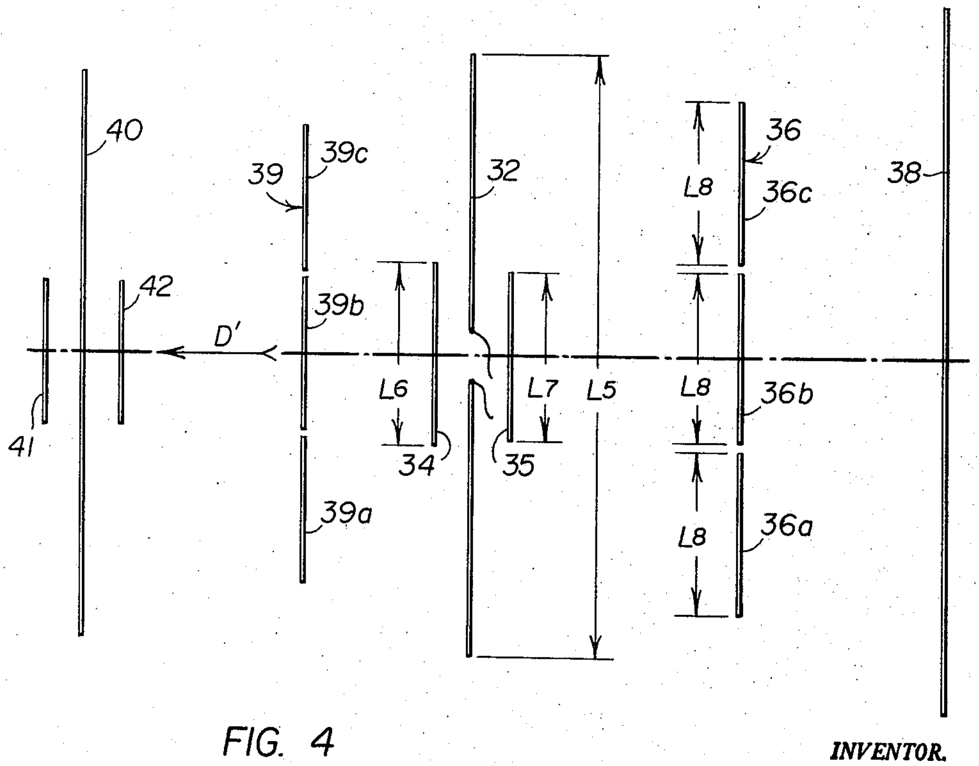
Fig. 4 is a diagrammatic plan view of the electrically functioning elements of the antenna of Fig. 3.

Referring now to the antenna of Figs. 3 and 4, the several electrically functioning elements are shown in Fig. 3 mounted on a horizontally disposed boom 30 secured in any desired manner to a vertical mast 31. The electrically functioning elements in this particular antenna are arranged to have maximum sensitivity in the single direction indicated by the arrow D' at what is considered as the forward direction. These electrically functioning elements comprise a conventional low band, folded dipole 32 having the ends of a two-conductor transmission line 33 connected thereto in a conventional manner; an anterior, closely spaced, nondriven, high band dipole 34, which is somewhat less than one-third the electrical length of the folded dipole 32; a posterior, closely spaced, nondriven, high band dipole 35, which is somewhat shorter electrically than the nondriven dipole 34; and a high band reflector, generally designated 36, disposed further to the rear of the driven, folded dipole 32 than the nondriven dipole 35. These elements constitute the basic array for achieving the objects of the invention.

As shown, the nondriven dipoles 34 and 35 are structurally the same as the nondriven dipoles 14 and 15 of the antenna of Figs. 1 and 2. In this instance, also, the nondriven dipoles 34 and 35 could be plain, straight rods or tubes of appropriate diameter and length and still function in the same manner.

The high band reflector 36 comprises three collinear, tubular conductors **36*a*, 36*b*, and 36*c* connected one to another in axially spaced relationship by a pair of insulators 37 that may suitably extend snugly into the adjacent members connected thereby for holding them rigidly in coaxial alignment. Each individual conductor 36*a*, 36*b*, and 36*c* may suitably be approximately the same length as, or slightly longer than, the anterior, nondriven dipole 34 so as to have its maximum effectiveness as are reflector element on the high band channel for which the length of that nondriven dipole (the longer of the nondriven dipoles 34 and 35) is selected as hereinafter described. The high band reflector 36 is spaced from the driven dipole 32** a distance selected to achieve maximum effectiveness on this same high band channel.

Details of the dimensions and relative spacing of electrical elements 32, 34, 35, and 36 will be given below with reference to Fig. 4.

The other electrically functioning elements of the antenna of Figs. 3 and 4 comprise a conventional low band reflector 38 dimensioned relative to and spaced rearwardly from the driven dipole 32 for maximum low band reflector action on the channel for which the length of the driven folded dipole 32 is selected. The low band reflector 38 performs its function in the low band range in a normal manner in accordance with normal reflector theory.

A three-element, high band, collinear director, generally designated 39 is desirably positioned forwardly of the folded dipole 32 and of the nondriven, high band dipole 34. Its spacing from the folded dipole 32 and the length of its collinear elements **39*a*, 39*b*, and 39*c* are determined by normal director theory, considering the folded dipole 32** as though it were a high band, three-element, collinear array.

In order to further enhance the gain of the antenna on low band, a low band director 40 may be positioned forwardly of the collinear director 39. In order to further enhance the gain of the antenna on high band, or at least avoid any adverse effect of the low band director 40 on the high band gain, this director 40 has associated with it, in closely spaced, centrally aligned, parallel relationship, a pair of nondriven dipoles 41 and 42, each somewhat less than one-third the length of the director 40. This combination of elements 40, 41, and 42 is designed in accordance with the invention described and claimed in a copending application of Jan K. Kobler, Serial No. 555,097, filed December 23, 1955, for Dual Band Antenna Array (Patent No. 2,893,004). As disclosed and claimed in said copending application, the director 40 of Figs. 3 and 4 functions as a normal low band director at the low band frequency for which it is dimensioned, without being materially affected by the presence of the shorter dipole elements 41 and 42 associated therewith. On high band, however, the dipole elements 41 and 42, when associated with the director 40 as described, function as phase reversing elements and give the director 40 the characteristics of a three-element, collinear, high band director similar to the collinear director 39.

Referring now to Fig. 4, illustrative dimensions will be given for rendering this antenna effective with high gain on channels 2, 11, and 13 in the forward direction D'. It will be understood that these illustrative dimensions may be varied to adapt the antenna for receiving other combinations of low and high band channels in accordance with the invention.

The driven, folded dipole 32 may suitably be made of ⅜ inch diameter aluminum tubing and have an overall length $L_5$ of 92 inches to render it resonant as a half-wave dipole in the range of 54–60 mc. (the frequency range of low band channel 2).

The nondriven dipole 34 may suitably be made of aluminum rod 0.130 inch in diameter and have a tip-to-tip length $L_6$ of 28 inches, as folded. By spacing this nondriven dipole 34 about 3 inches in front of the folded dipole 32, the latter is rendered highly effective on channel 11 in the high band with essentially the two-lobe radiation pattern of a three-element collinear array dimensioned for channel 11, but with a substantial front-to-back ratio.

The nondriven dipole 35 may suitably be made of the same material and configuration as the nondriven dipole 34 and may have a tip-to-tip length $L_7$ of 26 inches, as folded. By spacing this nondriven dipole 35 about 3½ inches behind the driven dipole 32, the latter is rendered highly effective on channel 13 with essentially the radiation pattern of a three-element collinear array dimensioned for optimum gain on channel 13, but with a substantial back-to-front ratio (rather than a substantial front-to-back ratio).

The electrical lengths of the two nondriven dipoles 34 and 35 depart materially from one-half wave length at the middle frequencies of channels 11 and 13, respectively, because of the excessive length of the driven, folded dipole 32, which is required to make it effective with maximum gain on channel 2. The selected electrical lengths of the two nondriven dipoles 34 and 35 are enough shorter than one-third the electrical length of the folded dipole 32 to render them most effective, respectively, on channels 11 and 13, as indicated above, when spaced appropriately from the folded dipole 32. By making the folded dipole 32 somewhat shorter and sacrificing some performance on channel 2 (as was done in the antenna of Figs. 1 and 2), the electrical lengths of the nondriven dipoles 34 and 35 could be brought closer to one-third of the electrical length of the driven, folded dipole 32, as would normally be desired, and closer to one-half wave length at the middle frequencies of channels 11 and 13.

The collinear high band reflector 36 may be made up of three pieces of ⅜ inch diameter aluminum tubing, each having a length $L_8$ of about 28 inches. It is suitably spaced about 20 inches behind the driven, folded dipole 32. This length and spacing are the result of "cut and try" experimentation to obtain maximum forward gain on both channels 11 and 13 while reversing the direction of maximum gain on channel 13.

The low band reflector 38 is designed according to conventional reflector theory, both as to its length and its spacing from the driven, folded dipole 32 for obtaining maximum reflector action on channel 2. The high band collinear director 39 is designed according to conventional director theory, and the length of its component elements 39*a*, 39*b*, and 39*c* and the spacing of this director in front of the driven, folded dipole 32 being selected to give maximum director action, in this instance, on channel 13.

The low band director 40 and its associated nondriven dipoles 41 and 42 are designed according to the principles of the invention of the aforementioned Patent No. 2,893,004 of Jan K. Kobler, so as to give maximum director action on low band channel 2 and the most favorable effect possible on channels 11 and 13 without sacrificing performance on channel 2. Thus, the optimum length of the low band director 40, in this instance, has been found to be about 90 inches, and the lengths of the associated nondriven dipoles 41 and 42 both about 25 inches when spaced about 2 inches in front and in back of the director 40.

For the same reasons given in describing the antenna of Figs. 1 and 2, further dimensional details for the optional elements 38, 39, 40, 41, and 42 are believed to be unnecessary in this specification.

Summarizing the overall effect of the electrically functioning elements in the antenna of Figs. 3 and 4, by selecting the proper dimensions for the parasitic elements 38, 39, 40, 41, and 42, the antenna will have pronounced forward gain peaks on channels 2, 11, and 13. On the low band, the gain will rapidly fall off on channels 3 to 6, getting progressively poorer toward channel 6. On high band, the gain will drop off markedly below channel 11, getting progressively worse toward channel 7, and may also drop considerably on channel 12. By reason of the presence of the high band reflector 36 and the low band reflector 38, moreover, as well as by reason of the directors 39 and 40 and the elements 41 and 42 associated with the director 40, the array has a very high front-to-back ratio on the several low and high band channels for which it is specifically designed. As pointed out above, the high band reflector 36 is essential in the combination to achieve the desired forward gain on the high band channels for which the antenna is specifically designed, with a good front-to-back ratio, although the reflector 16 need not necessarily be of the particular collinear type shown and described. On the other hand, the low band reflector 38 and the directors 39 and 40, including the elements 41 and 42 associated with the director 40, or any of numerous possible variations thereof, are optional for enhancing the novel characteristics of the basic combination of elements 32, 34, 35, and 36.

It is to be particularly noted that, in the antenna of Figs. 3 and 4, the longer, nondriven dipole 34 is in front of the driven dipole 32 and the shorter, nondriven dipole 35 is behind the driven dipole—the reverse of the arrangement in Figs. 1 and 2. This is not the preferred arrangement for most situations because maximum high band reflector efficiency would be desirable for the frequencies of operation of the rearward nondriven dipole, since the radiation pattern at these frequencies must be reversed or inverted to obtain the desired forward gain at these frequencies. However, the high band reflector must normally be a little longer than is optimum for the higher frequencies for which the length of the shorter, nondriven dipole is selected in order to function as a reflector (rather than as a director) for the lower frequencies for which the length of the longer, nondriven dipole is selected.

With the nondriven dipoles 34 and 35 respectively cut for the closely spaced frequency bands of channels 11 and 13, their neutralizing or trapping effect at intermediate frequencies tends to impair the gain at either the upper frequencies of the lower channel, or the lower frequencies of the upper channel, or both, when the shorter, nondriven dipole is in front of and the longer, nondriven dipole is behind the driven dipole 32. In the antenna of Figs. 3 and 4, however, it has been found that the trapping effect is minimized, or restricted in range, by reversing the normally desired relationship of the nondriven dipoles 34 and 35, i.e., in this case by placing the longer one in front of and the shorter one behind the driven dipole 32, as shown. Because channels 11 and 13 are so close together in frequency, the length of the reflector 36 can be long enough to function as a reflector on channel 11 and still be short enough to do a good job of reversing the radiation pattern and increasing the gain on channel 13.

From the foregoing description of two illustrative embodiments of the present invention, it will be appreciated that the principles disclosed may be utilized in a variety of ways in accordance with the invention for tailoring antennas to meet reception needs in specific geographical areas. The invention is intended to embrace all such variations as fall within the reasonable scope of the appended claims.

What is claimed is:

1. A television receiving antenna comprising a driven dipole dimensioned for resonance as a half-wave dipole at a low band frequency, a pair of nondriven dipoles disposed in closely spaced parallel relationship with said driven dipole, one centrally in front of and the other centrally behind the driven dipole with reference to a desired direction of maximum sensitivity, said nondriven dipoles being spaced from said driven dipole in the range of about 1% to about 7% of a half-wave length at said low band frequency, and the electrical lengths of said nondriven dipoles being about a half-wave at substantially different high band frequencies, said lengths being respectively selected to render the driven dipole responsive with pronounced gain peaks in the high band on two high band channels separated by at least one intervening channel, and a high band reflector disposed in spaced parallel relationship with said driven dipole and behind the same with reference to said desired direction of maximum sensitivity and substantially farther from the driven dipole than either of said pair of nondriven dipoles, said reflector being dimensioned and spaced from said driven dipole for reflector action at substantially the lower of said two high band channels.

2. An antenna according to claim 1 in which said driven dipole is a folded dipole.

3. An antenna according to claim 1, including at least one low band reflector disposed behind said high band reflector and at least one high band director disposed in front of the forward one of said nondriven dipoles.

4. An antenna according to claim 1 in which said high band reflector is a three-element collinear reflector comprising three axially spaced and aligned high band reflector elements.

5. A television receiving antenna comprising a driven dipole dimensioned for resonance as a half-wave dipole at a low band frequency, a pair of nondriven dipoles disposed in closely spaced parallel relationship with said driven dipole, one centrally in front of and the other centrally behind the driven dipole with reference to a desired direction of maximum sensitivity, said nondriven dipoles being spaced from said driven dipole in the range of about 1% to about 7% of a half-wave length at said low band frequency, and the electrical lengths of said nondriven dipoles being about a half-wave at substantially different high band frequencies with the shorter one disposed in front of the driven dipole and the longer one disposed behind the driven dipole, said lengths being selected to render the driven dipole responsive with pronounced gain peaks in the high band on two high band channels separated by at least one intervening channel, and a high band reflector disposed in spaced parallel relationship with said driven dipole and behind the same with reference to said direction of maximum sensitivity and substantially farther from the driven dipole than either of said pair of nondriven dipoles, said reflector benig dimensioned and spaced from said driven dipole for reflector action at substantially the lower of said two high band channels.

6. An antenna according to claim 5 in which said driven dipole is a folded dipole.

7. An antenna according to claim 5, including at least one low band reflector disposed behind said high band reflector and at least one high band director disposed in front of the forward one of said nondriven dipoles.

8. An antenna according to claim 5 in which said high band reflector is a three-element collinear reflector comprising three axially spaced and aligned high band reflector elements.

9. An antenna according to claim 5 in which said driven dipole is a folded dipole and said high band reflector is a three-element collinear reflector comprising three axially spaced and aligned high band reflector elements.

No references cited.